(12) United States Patent
Hara

(10) Patent No.: US 7,065,436 B2
(45) Date of Patent: Jun. 20, 2006

(54) VARIABLE RATIO STEERING SYSTEM

(75) Inventor: Kazuo Hara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 312 days.

(21) Appl. No.: 10/299,697

(22) Filed: Nov. 20, 2002

(65) Prior Publication Data
US 2003/0114970 A1 Jun. 19, 2003

(30) Foreign Application Priority Data
Dec. 13, 2001 (JP) ............................. 2001-380532

(51) Int. Cl.
*B62D 6/00* (2006.01)

(52) U.S. Cl. ........................................ 701/41
(58) Field of Classification Search ............... 701/41, 701/36, 51–53, 58, 61; 180/6.2, 6.44, 6.48, 180/337–338, 421–423
See application file for complete search history.

(56) References Cited

U.S. PATENT DOCUMENTS 4,524,842 A * 6/1985 Kanazawa ............ 180/400
4,893,690 A * 1/1990 Mori et al. ............ 180/414
5,265,019 A 11/1993 Harara et al.
5,489,004 A 2/1996 Shimizu et al.

FOREIGN PATENT DOCUMENTS

| EP | 0 853 029 A2 | 7/1997 |
| JP | 62-46767 A | 2/1987 |
| JP | 4-159178 | 6/1992 |
| JP | 7-257406 | 10/1995 |

* cited by examiner

*Primary Examiner*—Thu V. Nguyen
(74) *Attorney, Agent, or Firm*—Foley & Lardner LLP

(57) ABSTRACT

In a variable ratio steering system of a vehicle with a variable steering ratio mechanism varying a steering ratio R of steering wheel angle $\theta_S$ to road wheel steer angle $\theta_W$ at steered road wheels, a vehicle speed sensor, and a steering angle sensor, a steering ratio control unit controls the steering ratio according to a fixed steering ratio characteristic when the steering wheel angle $\theta_S$ is less than or equal to a predetermined angle $\theta_1$ substantially corresponding to a neutral position of a steering wheel. Conversely when the steering wheel angle $\theta_S$ is greater than the predetermined angle $\theta_1$ substantially corresponding to the neutral position of the steering wheel, the steering ratio control unit controls the steering ratio according to a vehicle-speed dependent steering ratio characteristic that a steering angle versus road wheel steer angle characteristic varies depending on a vehicle speed value.

15 Claims, 6 Drawing Sheets

VARIABLE RATIO STEERING SYSTEM

TECHNICAL FIELD

The present invention relates to a variable ratio steering system capable of varying a steering ratio of steering wheel rotation angle to steer angle at steered road wheels.

BACKGROUND ART

Many steering systems provide variable ratio steering. Such variable ratio steering systems have been disclosed in Japanese Patent Provisional Publication No. 4-159178 (hereinafter is referred to as "JP4-159178" and corresponding to U.S. Pat. No. 5,265,019) and Japanese Patent Provisional Publication No. 7-257406 (hereinafter is referred to as "JP7-257406" and corresponding to U.S. Pat. No. 5,489,004).

The variable ratio steering system disclosed in JP4-159178 includes a transmission ratio changing mechanism arranged between a steering wheel and tie-rod linkages, an actuator driving the transmission ratio changing mechanism, steering sensor means, a vehicle speed sensor, and a controller. The transmission ratio changing mechanism serves to change a transmission ratio of a steer angle at steerable front wheels with respect to a steering wheel rotation angle, simply a steering wheel angle. In order to monitor a turning state of the steering wheel, the steering sensor means is comprised of a turning angle sensor, a turning angular velocity sensor (an angular turning speed sensor), and a transverse acceleration sensor, respectively detecting the steering wheel angle (a turning angle), the turning angular velocity of the steering wheel (i.e., the time rate of change in the steering wheel angle), and the lateral acceleration acting on the vehicle body. The controller controls the actuator on the basis of the sensor signals from the vehicle speed sensor and the steering sensor means. The controller generates a control signal to the actuator so that the steer angle at the front wheels is increasingly compensated for, when (i) a first condition wherein the vehicle speed is greater than or equal to a predetermined speed that the front wheels oscillatingly returns to the straight-ahead position after a turn is completed and the steering wheel is released, and (ii) a second condition wherein the turning angular velocity of the steering wheel is greater than or equal to a reference value, are both satisfied.

The variable ratio steering system disclosed in JP7-257406 includes an input shaft to which the steering wheel torque is delivered, an output shaft that transmits a steering force (or a steering torque) acting on the steered road wheel for steering, a first shaft (for example, the input shaft itself) mechanically linked to one of the input and output shafts, a second shaft (for example, the output shaft itself) mechanically linked to the first shaft such that relative movement of the second shaft to the first shaft is permitted, actuating means that causes the relative movement of the second shaft to the first shaft, and a third shaft integrally formed with or integrally connected to the second shaft such that the axis of the third shaft is eccentric to the axis of the second shaft. The drive means is comprised of a support member rotatably supported by a casing in such a manner as to rotatably support the first or second shafts at an eccentric position to the center of rotation of the support member, and a drive source that causes rotary motion of the support member. With the aforesaid arrangement of the variable ratio steering system of JP7-257406, it is possible to reconcile two requirements, that is, good handling (in other words, production of a greater road-wheel steer angle by a small steering wheel input) during low-speed driving, and stable vehicle behavior (in other words, prevention of an excessively high steering response) during high-speed driving.

SUMMARY OF THE INVENTION

However, when a so-called tempa tire (a temporary-use tire) having a tire diameter smaller than a usual tire diameter is installed on either one of a pair of steered wheels, or when a wheel alignment difference between the steered wheels exists as a result of long driving and frictional contact with curbs, it is difficult to permanently maintain a proper relationship between a neutral position (a straight-ahead position) of the steering wheel and a position corresponding to zero average steer angle of the steered wheels. In such a case, even during straight-ahead driving, the steering system has an increased tendency of undesired offsetting of the steering wheel from its neutral position.

Figure 10A:
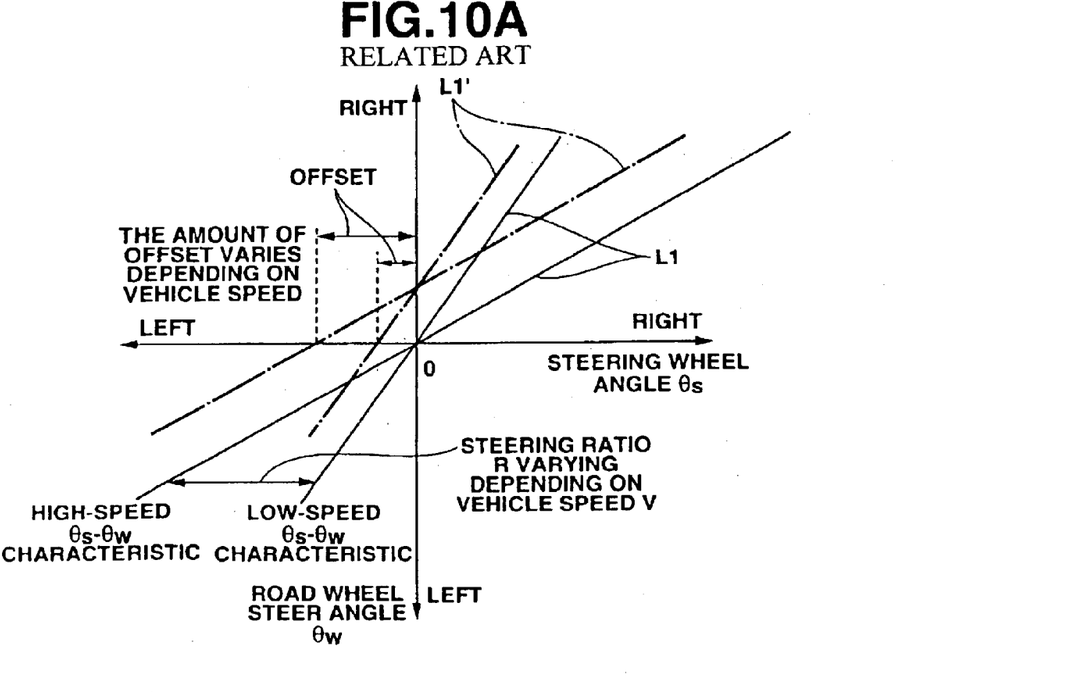
FIG. 10A is an explanatory view illustrating variations in vehicle-speed dependent steering wheel angle $\theta_S$ versus road wheel steer angle $\theta_W$ characteristics of the variable ratio steering system as disclosed in JP4-159178, in case that the proper relationship between steering wheel angle $\theta_S$ and road wheel steer angle $\theta_W$ is broken.

FIG. 10A shows variable steering ratio characteristics obtained by the variable ratio steering system as disclosed in JP4-159178. The variable steering ratio characteristic indicated by the fine solid line L1 having a relatively higher gradient shows a low-speed-mode steering wheel angle $\theta_S$ versus road wheel steer angle $\theta_W$ characteristic obtained under a desirable condition wherein the proper relative-position relationship between the neutral position of the steering wheel and the position corresponding to zero average steer angle of the steered wheels is maintained, whereas the variable steering ratio characteristic indicated by the fine solid line L1 having a relatively lower gradient shows a high-speed-mode steering wheel angle $\theta_S$ versus road wheel steer angle $\theta_W$ characteristic obtained in presence of the proper relative-position relationship. On the other hand, the variable steering ratio characteristic indicated by the heavy one-dotted line L1' having a relatively higher gradient shows a low-speed-mode steering wheel angle $\theta_S$ versus road wheel steer angle $\theta_W$ characteristic obtained under an undesirable condition wherein the proper relationship between the neutral position of the steering wheel and the position corresponding to zero average steer angle of the steered wheels is broken, whereas the variable steering ratio characteristic indicated by the heavy one-dotted line L1' having a relatively lower gradient shows a high-speed-mode steering wheel angle $\theta_S$ versus road wheel steer angle $\theta_W$ characteristic obtained in absence of the proper relative-position relationship (in other words, in presence of undesired offsetting of the steering wheel from the neutral position). As can be appreciated from the two one-dotted lines (L1', L1') shown in FIG. 10A, if the proper relative-position relationship has been broken and thus the aforementioned undesired offset exists, when road wheel steer angle $\theta_W$ has to be maintained at 0, there is an offset of the steering wheel angle $\theta_S$ from the origin O corresponding to the neutral position of the steering wheel. Note that the amount of offset of the steering wheel angle $\theta_S$ from the origin O is dependent on the vehicle speed.

Figure 10B:
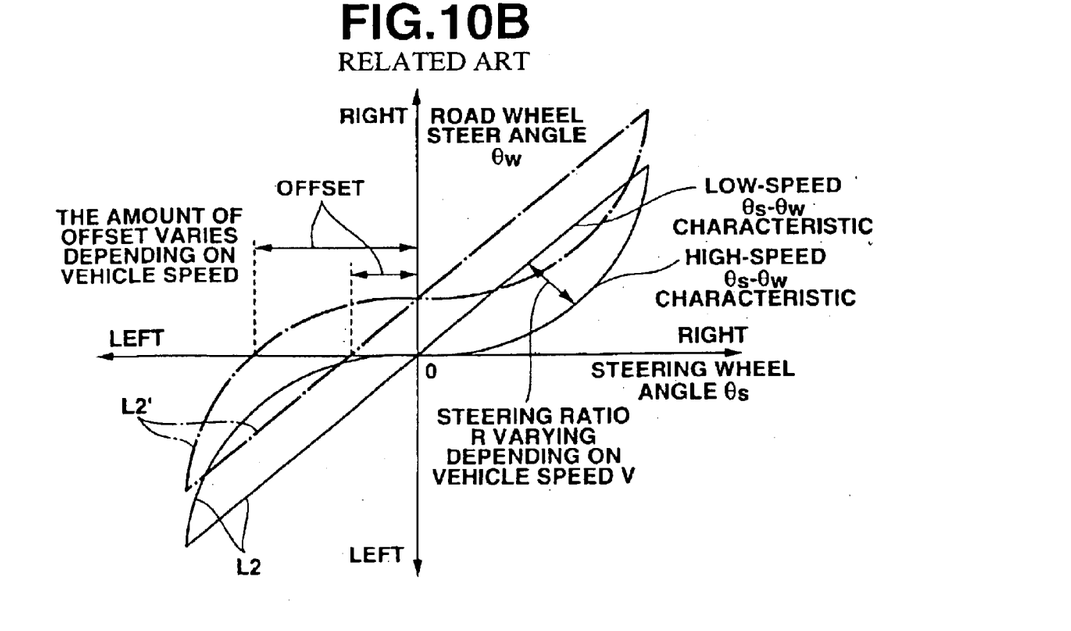
FIG. 10B is an explanatory view illustrating variations in vehicle-speed dependent steering wheel angle $\theta_S$ versus road wheel steer angle $\theta_W$ characteristics of the variable ratio steering system as disclosed in JP7-257406, in case that the proper relationship between steering wheel angle $\theta_S$ and road wheel steer angle $\theta_W$ is broken.

FIG. 10B shows variable steering ratio characteristics obtained by the variable ratio steering system as disclosed in JP7-257406. The variable steering ratio characteristic indicated by the fine solid straight line L2 shows a low-speed-mode steering wheel angle $\theta_S$ versus road wheel steer angle $\theta_W$ characteristic obtained under a desirable condition wherein the proper relative-position relationship between the neutral position of the steering wheel and the position corresponding to zero average steer angle of the steered wheels is maintained, whereas the variable steering ratio characteristic indicated by the fine solid curved line L2 shows a high-speed-mode steering wheel angle $\theta_S$ versus road wheel steer angle $\theta_W$ characteristic curve obtained in presence of the proper relative-position relationship. On the other hand, the variable steering ratio characteristic indicated by the heavy one-dotted straight line L2' shows a low-speed-mode steering wheel angle $\theta_S$ versus road wheel steer angle $\theta_W$ characteristic obtained under an undesirable condition wherein the proper relative-position relationship between the neutral position of the steering wheel and the position corresponding to zero average steer angle of the steered wheels is broken, whereas the variable steering ratio characteristic indicated by the heavy one-dotted curved line L2' shows a high-speed-mode steering wheel angle $\theta_S$ versus road wheel steer angle $\theta_W$ characteristic curve obtained in absence of the proper relative-position relationship (in other words, in presence of undesired offsetting of the steering wheel from the neutral position). As can be appreciated from the two one-dotted lines (L2', L2') shown in FIG. 10B, if the proper relative-position relationship has been broken and thus the aforementioned undesired offset exists, when road wheel steer angle $\theta_W$ has to be maintained at 0, there is an offset of the steering wheel angle $\theta_S$ from the origin O corresponding to the neutral position of the steering wheel. Note that the amount of offset of the steering wheel angle $\theta_S$ from the origin O is dependent on the vehicle speed.

As set forth above, in the variable ratio steering systems as disclosed in JP4-159178 and JP7-257406 in which a steering ratio varies depending on the vehicle speed, if the proper relationship between steering wheel angle $\theta_S$ and road wheel steer angle $\theta_W$ is broken and thus the vehicle-speed dependent $\theta_S$–$\theta_W$ characteristic, that is, the vehicle-speed dependent variable steering ratio characteristic has undesirably changed, an angular position of the steering wheel, required to maintain the vehicle running state at straight ahead responsively to vehicle-speed changes, tends to fluctuate unstably. Such an unstable steering-wheel angular position, which may occur depending on vehicle-speed changes during straight-ahead driving, causes a poor steering feel.

Accordingly, it is an object of the invention to provide a variable ratio steering system, which avoids the aforementioned disadvantages.

It is another object of the invention to provide a variable ratio steering system, which is capable of stabilizing a steering-wheel angular position, required to maintain a vehicle running state at straight ahead responsively to vehicle-speed changes, even when the proper relationship between steering wheel angle $\theta_S$ and road wheel steer angle $\theta_W$ is broken, in other words, even in presence of undesired offsetting of a steering wheel angle $\theta_S$ versus road wheel steer angle $\theta_W$ characteristic from a designed $\theta_S$–$\theta_W$ characteristic.

In order to accomplish the aforementioned and other objects of the present invention, a variable ratio steering system of a vehicle comprises a variable steering ratio mechanism that varies a steering ratio of a steering angle of a manually-operated steering mechanism to a road wheel steer angle at a steered road wheel, a vehicle speed sensor that detects a vehicle speed, a steering angle sensor that detects the steering angle, a steering ratio control unit configured to be electronically connected to the vehicle speed sensor, the steering angle sensor and the variable steering ratio mechanism, for controlling the variable steering ratio mechanism responsively to the vehicle speed and the steering angle, and the steering ratio control unit controlling the variable steering ratio mechanism so that the steering ratio is kept constant irrespective of the vehicle speed when the steering angle is less than or equal to a predetermined angle substantially corresponding to a neutral position of the manually-operated steering mechanism.

According to another aspect of the invention, a variable ratio steering system of a vehicle comprises a variable steering ratio mechanism that varies a steering ratio of a steering angle of a manually-operated steering mechanism to a road wheel steer angle at a steered road wheel, a vehicle speed sensor that detects a vehicle speed, a steering angle sensor that detects the steering angle, a steering ratio control unit configured to be electronically connected to the vehicle speed sensor, the steering angle sensor and the variable steering ratio mechanism, for controlling the variable steering ratio mechanism responsively to the vehicle speed and the steering angle, and the steering ratio control unit switching the variable steering ratio mechanism to a non-control state to maintain the steering ratio at a structurally-determined steering ratio of the variable steering ratio mechanism kept in the non-control state when the steering angle is less than or equal to a predetermined angle substantially corresponding to a neutral position of the manually-operated steering mechanism.

According to a further aspect of the invention, a variable ratio steering system of a vehicle comprises a variable steering ratio mechanism that varies a steering ratio of a steering angle of a manually-operated steering mechanism to a road wheel steer angle at a steered road wheel, a vehicle speed sensor that detects a vehicle speed, a steering angle sensor that detects the steering angle, a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, and the steering ratio control unit having a processor programmed to perform the following:

(a) executing the fixed steering ratio control mode in which the steering ratio is kept constant irrespective of the vehicle speed, when the steering angle is less than or equal to a predetermined angle substantially corresponding to a neutral position of the manually-operated steering mechanism; and (b) executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

According to a still further aspect of the invention, in a computer-controlled variable ratio steering system for an automotive vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the system comprises a first variable ratio steering means for executing the fixed steering ratio control mode in which the steering ratio is kept constant irrespective of the vehicle speed, when the steering angle is less than or equal to a predetermined angle substantially corresponding to a neutral position of the manually-operated steering mechanism, and a second variable ratio steering means for executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

According to another aspect of the invention, a method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprises executing the fixed steering ratio control mode by keeping the steering ratio constant irrespective of the vehicle speed, when the steering angle is less than or equal to a predetermined angle substantially corresponding to a neutral position of the manually-operated steering mechanism, and executing the vehicle-speed dependent steering ratio control mode by varying a steering angle versus road wheel steer angle characteristic depending on the vehicle speed, when the steering angle is greater than the predetermined angle substantially corresponding to the neutral position of the manually-operated steering mechanism.

According to another aspect of the invention, a method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprises comparing the steering angle to a predetermined angle substantially corresponding to a neutral position of the manually-operated steering mechanism, switching the variable steering ratio mechanism to a non-control state to maintain the steering ratio at a structurally-determined steering ratio of the variable steering ratio mechanism for execution of the fixed steering ratio control mode, when the steering angle is less than or equal to the predetermined angle substantially corresponding to the neutral position of the manually-operated steering mechanism, and executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

According to another aspect of the invention, a method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprises comparing the steering angle to a predetermined angle substantially corresponding to a neutral position of the manually-operated steering mechanism, fixing the steering ratio to a predetermined steering ratio suited to a low speed range for execution of the fixed steering ratio control mode, when the steering angle is less than or equal to the predetermined angle substantially corresponding to the neutral position of the manually-operated steering mechanism, and executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

According to another aspect of the invention, a method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprises comparing the steering angle to a predetermined angle substantially corresponding to a neutral position of the manually-operated steering mechanism, fixing the steering ratio to a predetermined maximum steering ratio for execution of the fixed steering ratio control mode, when the steering angle is less than or equal to the predetermined angle substantially corresponding to the neutral position of the manually-operated steering mechanism, and executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

According to another aspect of the invention, a method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprises comparing the steering angle to a predetermined angle substantially corresponding to a neutral position of the manually-operated steering mechanism, fixing the steering ratio to a predetermined steering ratio suited to a high speed range for execution of the fixed steering ratio control mode, when the steering angle is less than or equal to the predetermined angle substantially corresponding to the neutral position of the manually-operated steering mechanism, and executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

According to another aspect of the invention, a method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprises comparing the steering angle to a predetermined angle substantially corresponding to a neutral position of the manually-operated steering mechanism, fixing the steering ratio to a predetermined minimum steering ratio for execution of the fixed steering ratio control mode, when the steering angle is less than or equal to the predetermined angle substantially corresponding to the neutral position of the manually-operated steering mechanism, and executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

The other objects and features of this invention will become understood from the following description with reference to the accompanying drawings.

DESCRIPTION OF THE PREFERRED EMBODIMENTS

Figure 1:
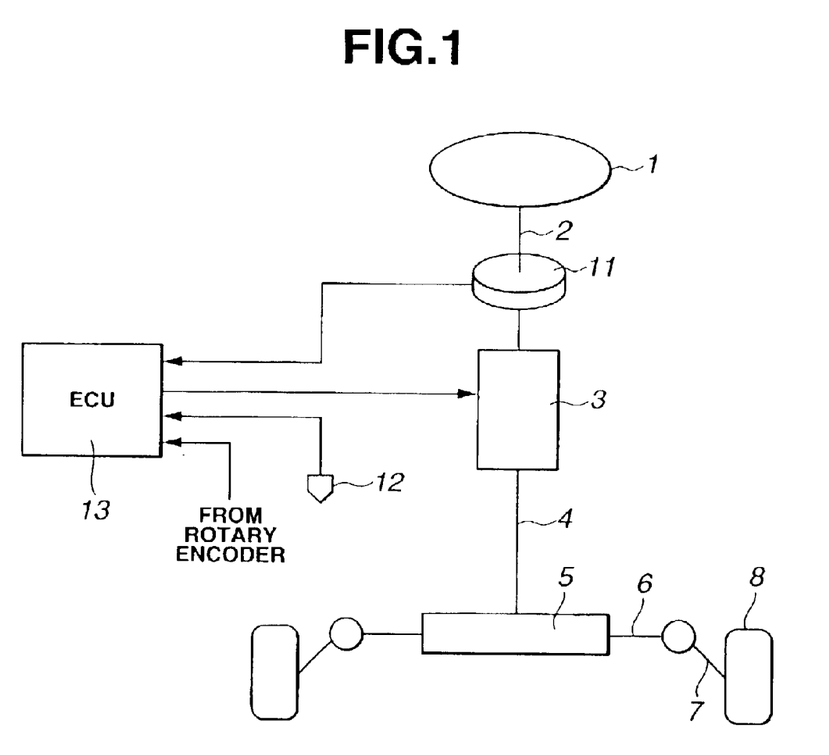
FIG. 1 is a schematic view of a variable ratio steering system of the first embodiment.

Referring now to the drawings, particularly to FIG. 1, a steering wheel (or a manually-operated handle or a manually-operated steering mechanism) 1 is mechanically linked to the input side of a variable steering ratio mechanism 3 via a steering input shaft 2 (simply, a steering shaft). Variable steering ratio mechanism 3 is provided to vary a steering ratio R of steering wheel rotation angle (steering angle or steering wheel angle) $\theta_S$ to steer angle at steered road wheels (road wheel steer angle) $\theta_W$. The output side of variable steering ratio mechanism 3 is mechanically linked to steered road wheels 8 through a pinion shaft 4, a steering gear 5, tie-road linkages 6, and knuckle arms 7 to steered road wheels 8, in that order. As clearly shown in FIG. 2, variable steering ratio mechanism 3 of the variable ratio steering system of the first embodiment is comprised of an electric motor 9 (serving as an actuator that changes the steering ratio) and a simple planetary gear system 10. A step motor is often used as electric motor 9. Simple planetary gear system 10 is comprised of a sun gear SG, a planetary gear (or a planet pinion) PG, and a ring gear RG. Ring gear RG is connected to steering shaft 2, planetary gear PG is connected to pinion shaft 4, and sun gear SG has a driven connection with the output shaft of electric motor 9. Rotary motion of the output shaft of electric motor 9 causes sun gear SG to rotate, and as a result the steering ratio varies. A steering wheel angle sensor (or a steering angle sensor) 11 is installed on steering shaft 2 to detect the steering wheel angle $\theta_S$ of steering wheel 1 manually operated by the driver. Steering wheel angle sensor 11 generates a zero voltage signal when steering wheel 1 is held at its neutral position. Steering wheel angle sensor 11 generates a positive voltage signal when steering wheel 1 is turned to the right, and generates a negative voltage signal when steering wheel 1 is turned to the left. In FIG. 1, reference sign 12 denotes a vehicle speed sensor that operates on a pulse-counter principle. Usually, vehicle speed sensor 12 is located at either a transmission or a transaxle (front-wheel drive vehicles) to generate a vehicle speed indicative signal $V_D$ having a signal frequency corresponding to the output shaft speed (for example, the transmission output shaft speed). Electric motor 9 of variable steering ratio mechanism 3 is electronically controlled in response to a control signal from an electronic steering ratio control unit (steering ratio control ECU) 13. Steering ratio control ECU 13 (steering ratio controller) generally comprises a microcomputer. The steering ratio controller includes an input/output interface (I/O), memories (RAM, ROM), and a microprocessor or a central processing unit (CPU). The input/output interface (I/O) of ECU 13 receives input information from various engine/vehicle sensors, namely a rotary encoder 9e attached to electric motor 9, steering wheel angle sensor 11, and vehicle speed sensor 12. Rotary encoder 9e is provided to detect the turning angle of the motor shaft and the direction of motor-shaft rotation, that is, the steering ratio data. Within ECU 13, the central processing unit (CPU) allows the access by the I/O interface of input informational data signals from the previously-discussed engine/vehicle sensors 9e, 11, and 12. The CPU of ECU 13 is responsible for carrying the variable steering ratio control program stored in memories and is capable of performing necessary arithmetic and logic operations (see FIG. 3, 7 or 8). Computational results (arithmetic calculation results), that is, a calculated output signal (an electric motor drive current) is relayed via the output interface circuitry of ECU 13 to an output stage, namely electric motor 9 of variable steering ratio mechanism 3 incorporated in the variable ratio steering system of the first embodiment.

Figure 3:
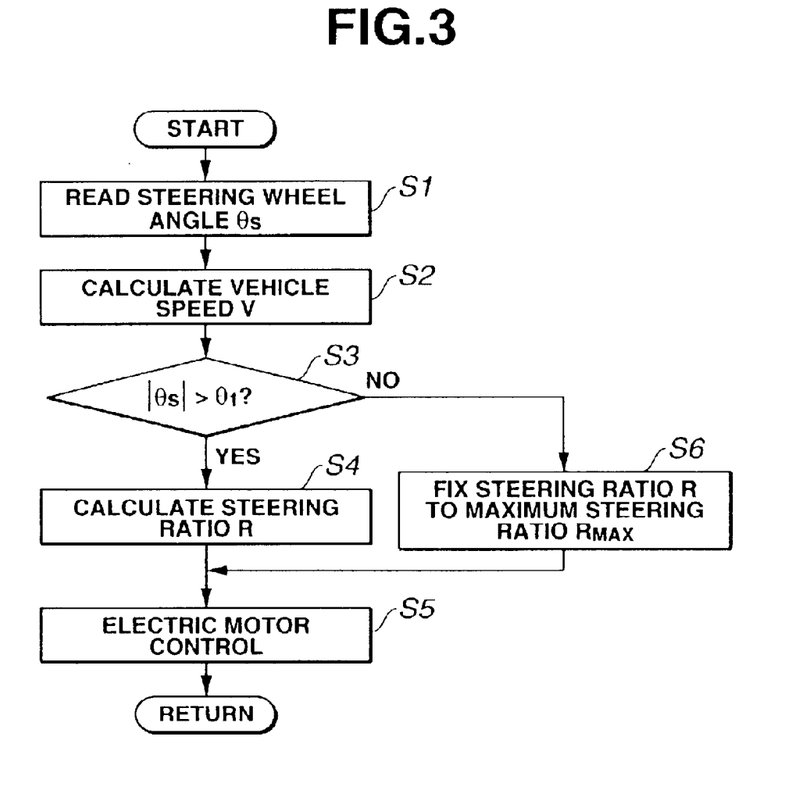
FIG. 3 is a flow chart illustrating a variable steering ratio control routine executed by a control unit incorporated in the variable ratio steering system of the first embodiment.

Hereinafter described in detail in reference to the flow chart shown in FIG. 3 is the variable steering ratio control routine executed by ECU 13 incorporated in the variable ratio steering system of the first embodiment. The arithmetic processing shown in FIG. 3 is executed as time-triggered interrupt routines to be triggered every predetermined sampling time intervals.

At step S1, steering wheel angle $\theta_S$, which is detected by steering wheel angle sensor 11, is read.

At step S2, a vehicle speed V is calculated based on vehicle speed indicative signal $V_D$ from vehicle speed sensor 12.

At step S3, a check is made to determine whether an absolute value $|\theta_S|$ of steering wheel angle $\theta_S$, read at step S1, exceeds a predetermined angle $\theta_1$. In the shown embodiment, predetermined angle $\theta_1$ is set to a predetermined low angle, such as 15 degrees or less, substantially corresponding to a neutral position ($\theta_S$=0) of steering wheel 1. When the answer to step S3 is in the affirmative (YES), that is, in case of $|\theta_S|>\theta_1$, ECU 13 determines that a turn is made with the steering wheel angle $\theta_S$ above predetermined angle $\theta_1$. The routine proceeds from step S3 to step S4.

Figure 4:
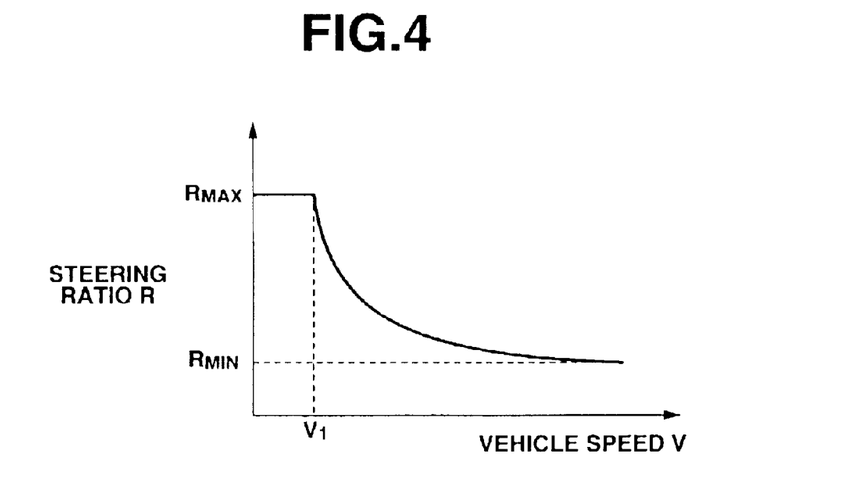
FIG. 4 is a characteristic diagram illustrating a predetermined vehicle speed V versus steering ratio R characteristic.

At step S4, a steering ratio R between an input angle $\theta_{IN}$ of steering wheel rotary motion (steering action) and an output angle $\theta_{OUT}$ of steered road wheel rotary motion is calculated or map-retrieved based on vehicle speed V (calculated through step S2) from a preprogrammed control map (predetermined vehicle speed V versus steering ratio R characteristic diagram) of FIG. 4 showing how steering ratio R has to be varied relative to vehicle speed V. Preprogrammed control map shown in FIG. 4 is pre-stored in the memories of ECU 13, and has a non-linear V-R characteristic hereinafter described in detail. The axis of abscissa (x-axis) of FIG. 4 indicates vehicle speed V, while the axis of ordinates (y-axis) of FIG. 4 indicates steering ratio R. As can be seen in the V-R characteristic curve of FIG. 4, steering ratio R is maintained at a predetermined maximum value (or a predetermined maximum steering ratio) $R_{MAX}$ in a predetermined low speed range of 0 to $V_1$ (a preset low vehicle speed value). When vehicle speed V begins to increase from preset low vehicle speed value $V_1$, at the beginning of the vehicle-speed increasing period from $V_1$, a rate of decrease in steering ratio R with respect to vehicle speed V is relatively great. In contrast, at the end of the vehicle-speed increasing period from $V_1$, the rate of decrease in steering ratio R with respect to vehicle speed V is relatively small. That is, when vehicle speed gradually increases from preset low vehicle speed value $V_1$, steering ratio R decreases in a non-linear fashion.

At step S5, first, a steering ratio controlled variable C is calculated based on both a sign of steering wheel angle $\theta_S$ and steering ratio R calculated through step S4. Second, a control signal corresponding to the steering ratio controlled variable C based on the sign of steering wheel angle $\theta_S$ and the calculated steering ratio R is output from the output interface of ECU 13 to electric motor 9, the controlled quantity (steering ratio R) is controlled so that the steering ratio is brought closer to a desired value. Thereafter, the routine returns to step S1.

In contrast to the above, when the answer to step S3 is in the negative (NO), that is, in case of $|\theta_S|\leq\theta_1$, ECU 13 determines that the vehicle is maintained in a substantially straight-ahead driving state. In this case, the routine proceeds from step S3 to step S6.

At step S6, in order to prevent or inhibit steering ratio R from fluctuating or changing depending on changes in vehicle speed V, steering ratio R is controlled or fixed to predetermined maximum steering ratio $R_{MAX}$ suited to the low speed range. In other words, in case of $|\theta_S|\leq\theta_1$, predetermined maximum steering ratio $R_{MAX}$ suited to the low speed range is held or determined as steering ratio R, until steering wheel angle $\theta_S$ exceeds predetermined angle $\theta_1$. Thereafter, the routine proceeds from step S6 to step S5. At step S5, first, steering ratio controlled variable C is calculated based on both a sign of steering wheel angle $\theta_S$ and predetermined maximum steering ratio $R_{MAX}$. Second, a control signal corresponding to the steering ratio controlled variable C based on the sign of steering wheel angle $\theta_S$ and predetermined maximum steering ratio $R_{MAX}$ is output from the output interface of ECU 13 to electric motor 9, so as to execute steering ratio control based on the fixed $\theta_S$–$\theta_W$ characteristic (the fixed steering ratio $R_{MAX}$ characteristic). In the variable steering ratio control routine shown in FIG. 3, the processing of step S1 and steering wheel angle sensor 11 serve as a steering wheel angle detector (steering wheel angle detecting means) that monitors or detects steering wheel angle $\theta_S$. The processing of step S2 and vehicle speed sensor 12 serve as a vehicle speed detector that monitors or detects vehicle speed V. The procedures of steps S3, S4, S5, and S6 serve as a steering ratio control circuitry (steering ratio control means).

Figure 5:
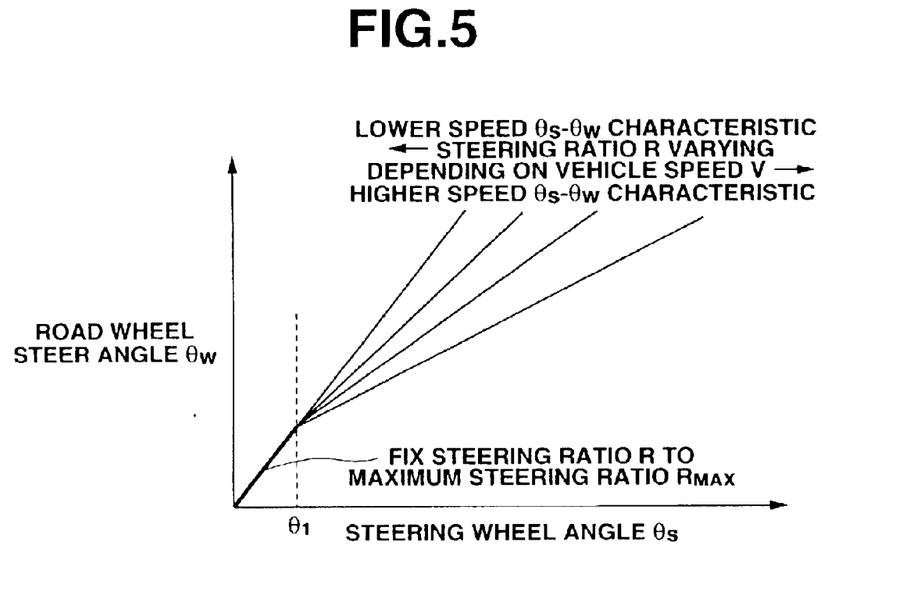
FIG. 5 is an explanatory view illustrating a fixed steering ratio $R_{MAX}$ characteristic and variations in vehicle-speed dependent steering wheel angle $\theta_S$ versus road wheel steer angle $\theta_W$ characteristics of the variable ratio steering system of the first embodiment in presence of a transition from a steering-ratio control state in which steering ratio R is controlled to a maximum steering ratio $R_{MAX}$ to another steering-ratio control state based on the vehicle speed.

With the previously-discussed arrangement of the first embodiment shown in FIGS. 3 and 5, suppose that the vehicle is maintained in a substantially straight-ahead driving state while manually maintaining steering wheel 1 at an angular position that the steering wheel angle $\theta_S$ detected is less than or equal to predetermined angle $\theta_1$ (that is, the preset low angle, such as 15 degrees or less, substantially corresponding to the neutral position ($\theta_S=0$) of steering wheel 1). As can be seen from the $\theta_S$–$\theta_W$ characteristic shown in FIG. 5, in the system of the first embodiment, variable steering ratio mechanism 3 is controlled based on predetermined maximum steering ratio $R_{MAX}$ suited to predetermined low speed range ($0 \leq V \leq V_1$) by means of ECU 13, until steering wheel angle $\theta_S$ exceeds predetermined angle $\theta_1$. That is to say, during a time period defined by $|\theta_S| \leq \theta_1$, ECU 13 computes or calculates steering ratio controlled variable C for electric motor 9 on the basis of predetermined maximum steering ratio $R_{MAX}$ (constant steering ratio). Then, a control signal corresponding to steering ratio controlled variable C based on predetermined maximum steering ratio $R_{MAX}$ is produced. As a result of this, it is possible to obtain road wheel steer angle $\theta_W$ based on predetermined maximum steering ratio $R_{MAX}$ (held constant in predetermined low speed range ($0 \leq V \leq V_1$) irrespective of changes in vehicle speed V), for steering wheel angle $\theta_S$ required to maintain the substantially straight-ahead driving state. The steering ratio controlled variable C is used to control a sun-gear rotation speed having the same sense as the turning direction of steering wheel 2. For instance, when steering wheel 1 is turned to the left (or to the right) and additionally steering wheel angle $\theta_S$ is less than or equal to predetermined angle $\theta_1$, the variable ratio steering system of the first embodiment operates as follows. During a right turn (a left turn) with a slight steering wheel angle below predetermined angle $\theta_1$, sun gear SG rotates clockwise (or counterclockwise) by way of clockwise rotation (or counterclockwise rotation) of the output shaft of electric motor 9. On the other hand, ring gear RG rotates clockwise (or counterclockwise) via steering shaft 2 (see FIG. 2). As a result of rotary motion of ring gear RG having the same rotation direction as rotary motion of sun gear SG, the amount of clockwise rotary motion (or counterclockwise rotary motion) of planetary gear PG in meshed-engagement with both ring gear RG and sun gear SG is increased or multiplied. In this case, simple planetary gear system 10 acts as a speed increaser. For steering wheel angle $\theta_S$ ($\leq \theta_1$) required for a slight turn, by virtue of the previously-discussed speed increasing action of simple planetary gear system 10, the system of the first embodiment can provide road wheel steer angle $\theta_W$ based on predetermined maximum steering ratio $R_{MAX}$ (held constant in predetermined low speed range ($0 \leq V \leq V_1$) irrespective of changes in vehicle speed V). As set forth above, according to the system of the first embodiment, steering ratio R is fixed to predetermined maximum steering ratio $R_{MAX}$ irrespective of changes in vehicle speed V when the vehicle is in a substantially straight-ahead driving state ($|\theta_S| \leq \theta_1$). Therefore, the steering wheel angle $\theta_S$ versus road wheel steer angle $\theta_W$ characteristic (the steering ratio R characteristic, in other words, the proper relationship between steering wheel angle $\theta_S$ and road wheel steer angle $\theta_W$) can be kept constant, even when a so-called tempa tire (a temporary-use tire) having a tire diameter smaller than a usual tire diameter is installed on either one of a pair of steered wheels, or even when a wheel alignment difference between the steered wheels exists as a result of long driving and frictional contact with curbs. This enhances the stability of the angular position of steering wheel 1 even when the vehicle is in the substantially straight-ahead driving state ($|\theta_S| \leq \theta_1$). In contrast to the above, when the operating state of the vehicle is changed from the substantially straight-ahead driving state ($|\theta_S| \leq \theta_1$) to a turning state ($|\theta_S| > \theta_1$), the $\theta_S$–$\theta_W$ characteristic is changed from the fixed $\theta_S$–$\theta_W$ characteristic (see the fixed steering ratio $R_{MAX}$ characteristic indicated by the heavy solid line in FIG. 5 and used in case of steering wheel angle $\theta_S$ defined by the inequality $|\theta_S| \leq \theta_1$) to a vehicle-speed V dependent $\theta_S$–$\theta_W$ characteristic (see the variable steering ratio R characteristics indicated by the fine solid lines in FIG. 5 and used in case of steering wheel angle $\theta_S$ defined by the inequality $|\theta_S| > \theta_1$). When the vehicle is running at low speeds during the transition from the substantially straight-ahead driving state ($|\theta_S| \leq \theta_1$) to the turning state ($|\theta_S| > \theta_1$), steering ratio R is still maintained at predetermined maximum steering ratio $R_{MAX}$ suited to the low speed range, thus ensuring a smooth transition from the fixed $\theta_S$–$\theta_W$ characteristic (in other words, the fixed steering ratio $R_{MAX}$ control) to the vehicle-speed V dependent $\theta_S$–$\theta_W$ characteristic (in other words, the variable steering ratio R control). Conversely when the vehicle is running at high speeds during the transition from the substantially straight-ahead driving state ($|\theta_S| \leq \theta_1$) to the turning state ($|\theta_S| > \theta_1$), the variable ratio steering system of the first embodiment exhibits a high steering response at the beginning of steering wheel movement in either turning direction owing to steering ratio R controlled at and near predetermined maximum steering ratio $R_{MAX}$. However, during such a transition the system control mode can be rapidly changed from the fixed steering ratio R control mode (see the fixed $\theta_S$–$\theta_W$ characteristic of FIG. 5) to the variable steering ratio R control mode (see the higher speed $\theta_S$–$\theta_W$ characteristic indicated by the fine solid line in FIG. 5 and having a relatively lower gradient), thereby reliably suppressing an oversensitive vehicle behavior during steering action. According to the system of the first embodiment, in case of $|\theta_S| \leq \theta_1$, steering ratio R is set to predetermined maximum steering ratio $R_{MAX}$ of the low speed range. Such setting of steering ratio R to predetermined maximum steering ratio $R_{MAX}$ suited to the low speed range is suitable to realize a smooth transition from the fixed steering ratio $R_{MAX}$ control mode to the vehicle-speed dependent variable steering ratio R control mode under a particular vehicle operating condition in which the number of steering wheel movements in the opposing turning directions is large during low-speed vehicle running, such as when putting the vehicle into a garage. In the system of the first embodiment shown in FIGS. 2 and 3, steering ratio R is controlled or fixed to predetermined maximum steering ratio $R_{MAX}$ suited to the low speed range in case of $|\theta_S| \leq \theta_1$. In order to provide almost the same effect and operation of the system of the first embodiment, such setting of steering ratio R to predetermined maximum steering ratio $R_{MAX}$ may be somewhat modified so that steering ratio R is controlled or fixed to a predetermined large steering ratio substantially corresponding to maximum steering ratio $R_{MAX}$. The predetermined large steering ratio is set to a value near maximum steering ratio $R_{MAX}$, but not equal to maximum steering ratio $R_{MAX}$.

Figure 6:
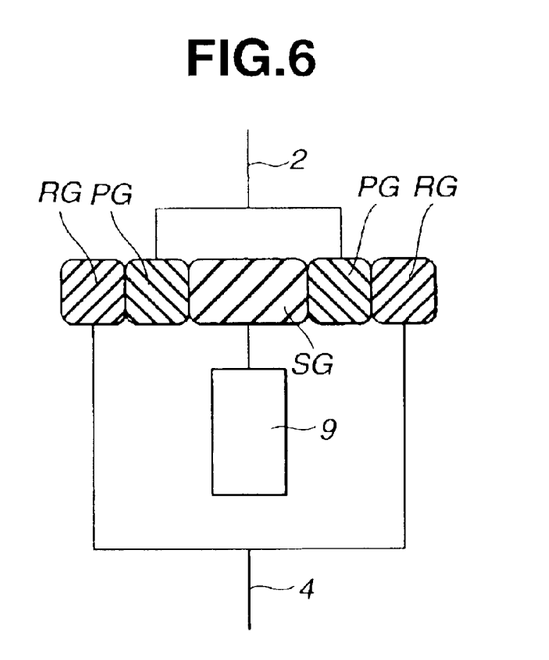
FIG. 6 is an enlarged view illustrating details of a variable steering ratio mechanism incorporated in the variable ratio steering system of the second embodiment, including a simple planetary gear system and an electric motor.
Figure 7:
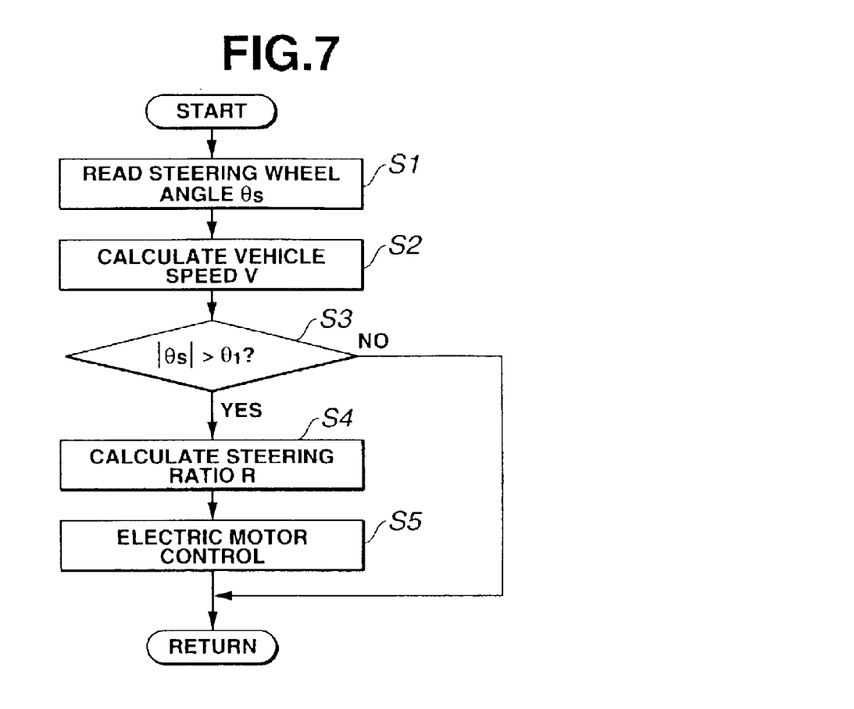
FIG. 7 is a flow chart illustrating a variable steering ratio control routine executed by a control unit incorporated in the variable ratio steering system of the second embodiment.

Referring now to FIGS. 6 and 7, there is shown the variable ratio steering system of the second embodiment.

Figure 2:
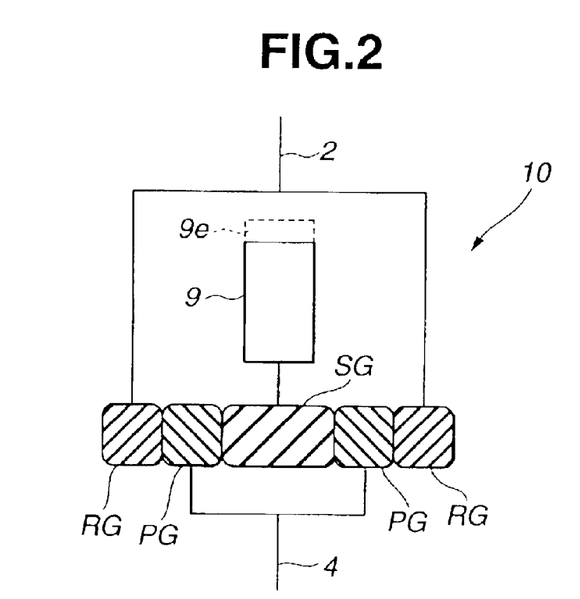
FIG. 2 is an enlarged view illustrating details of a variable steering ratio mechanism incorporated in the variable ratio steering system of the first embodiment, including a simple planetary gear system and an electric motor.

The system of the second embodiment of FIGS. 6 and 7 is different from that of the first embodiment of FIGS. 2 and 3, in that in the system of the second embodiment variable steering ratio mechanism 3 is maintained in a non-control state while steering wheel angle $\theta_S$ is less than or equal to predetermined angle $\theta_1$. As shown in FIG. 6, variable steering ratio mechanism 3 of the variable ratio steering system of the second embodiment is comprised of an electric motor 9 (serving as an actuator that changes the steering ratio) and a simple planetary gear system 10. In simple planetary gear system 10 of the second embodiment, planetary gear PG is connected to steering shaft 2, ring gear RG is connected to pinion shaft 4, and sun gear SG has a driven connection with the output shaft of electric motor 9. Rotary motion of the output shaft of electric motor 9 causes sun gear SG to rotate, and as a result the steering ratio varies. FIG. 7 shows the variable steering ratio control routine executed by ECU 13 incorporated in the variable ratio steering system of the second embodiment. The arithmetic processing shown in FIG. 7 is also executed as time-triggered interrupt routines to be triggered every predetermined sampling time intervals. The arithmetic processing of FIG. 7 is similar to the arithmetic processing of FIG. 3, except that step S6 is cancelled and in case of $|\theta_S| \leq \theta_1$ the routine returns from step S3 to step S1, while skipping steps S4 and S5. Thus, the same step numbers used to designate steps in the routine shown in FIG. 3 will be applied to the corresponding step numbers used in the modified arithmetic processing shown in FIG. 7, for the purpose of comparison of the two different interrupt routines. Detailed description of steps S1 through S5 will be omitted because the above description thereon seems to be self-explanatory.

According to the system of the second embodiment shown in FIGS. 6 and 7, when the answer to step S3 is in the negative (NO), that is, in case of $|\theta_S| \leq \theta_1$, ECU 13 determines that the vehicle is maintained in a substantially straight-ahead driving state. In this case, the routine returns from step S3 to step S1, so as to bring variable steering ratio mechanism 3 into a non-control state. In the variable steering ratio control routine shown in FIG. 7, the processing of step S1 and steering wheel angle sensor 11 serve as a steering wheel angle detector (steering wheel angle detecting means) that monitors or detects steering wheel angle $\theta_S$. The processing of step S2 and vehicle speed sensor 12 serve as a vehicle speed detector that monitors or detects vehicle speed V. The procedures of steps S3, S4, and S5 serve as a steering ratio control circuitry (steering ratio control means).

With the previously-discussed arrangement of the second embodiment, suppose that the vehicle is maintained in a substantially straight-ahead driving state while manually maintaining steering wheel 1 at an angular position that the steering wheel angle $\theta_S$ detected is less than or equal to predetermined angle $\theta_1$ (that is, the preset low angle, such as 15 degrees or less, substantially corresponding to the neutral position ($\theta_S=0$) of steering wheel 1). As can be seen from the flow of the control routine of FIG. 7 from step S3 to step S1, skipping steps S4 and S5, in the system of the second embodiment, electric motor 9 of variable steering ratio mechanism 3 is maintained in a non-control state while steering wheel angle $\theta_S$ is less than or equal to predetermined angle $\theta_1$. With electric motor 9 maintained in the non-control state, steering ratio R between input angle $\theta_{IN}$ of steering wheel rotary motion and output angle $\theta_{OUT}$ of steered road wheel rotary motion is determined by only a conventional gear ratio Rc of simple planetary gear system 10, regardless of changes in vehicle speed V. Conventional gear ratio Rc corresponds to a steering ratio that is structurally determined by a gear ratio among sun gear SG, planetary gear PG, and ring gear RG. More concretely, as seen from the enlarged view of FIG. 6, in the non-control state of electric motor 9, sun gear SG is stationary. In this case, steering shaft 2 serves as an input shaft that transmits input rotation to planetary gear PG, whereas pinion shaft 4 serves as an output shaft that carries output rotation from ring gear RG to steering gear 5. A fixed $\theta_S$–$\theta_W$ characteristic based on conventional gear ratio Rc is set to be equal to the constant steering ratio $R_{MAX}$ characteristic indicated by the heavy solid line in FIG. 5. Thus, for steering wheel angle $\theta_S$ ($\leq \theta_1$) required for a slight turn, with the structurally-determined conventional gear ratio Rc of simple planetary gear system 10, the system of the second embodiment can provide road wheel steer angle $\theta_W$ based on predetermined maximum steering ratio $R_{MAX}$, i.e., conventional gear ratio Rc (held constant in predetermined low speed range ($0 \leq V \leq V_1$) irrespective of changes in vehicle speed V). As set forth above, according to the system of the second embodiment, steering ratio R is fixed to predetermined maximum steering ratio $R_{MAX}$ (that is, conventional gear ratio Rc of simple planetary gear system 10) irrespective of changes in vehicle speed V when the vehicle is in a substantially straight-ahead driving state ($|\theta_S| \leq \theta_1$). Therefore, the steering wheel angle $\theta_S$ versus road wheel steer angle $\theta_W$ characteristic (the steering ratio R characteristic, in other words, the proper relationship between steering wheel angle $\theta_S$ and road wheel steer angle $\theta_W$) can be kept constant, even when a so-called tempa tire (a temporary-use tire) having a tire diameter smaller than a usual tire diameter is installed on either one of a pair of steered wheels, or even when a wheel alignment difference between the steered wheels exists as a result of long driving and frictional contact with curbs. This enhances the stability of the angular position of steering wheel 1 even when the vehicle is in the substantially straight-ahead driving state ($|\theta_S| \leq \theta_1$). In addition to the above, during a period of time that variable steering ratio mechanism 3 is maintained in a non-control state under a specified condition of $|\theta_S| \leq \theta_1$, electric motor 9 is held in its de-energized state. This contributes to reduced electric power consumption. In contrast to the above, when the operating state of the vehicle is changed from the substantially straight-ahead driving state ($|\theta_S| \leq \theta_1$) to a turning state ($|\theta_S| > \theta_1$), the $\theta_S$–$\theta_W$ characteristic is changed from the fixed $\theta_S$–$\theta_W$ characteristic (see the fixed steering ratio $R_{MAX}$ characteristic, in other words, the constant steering ratio Rc characteristic indicated by the heavy solid line in FIG. 5 and used in case of steering wheel angle $\theta_S$ defined by the inequality $|\theta_S| \leq \theta_1$) to a vehicle-speed V dependent $\theta_S$–$\theta_W$ characteristic (see the variable steering ratio R characteristics indicated by the fine solid lines in FIG. 5 and used in case of steering wheel angle $\theta_S$ defined by the inequality $|\theta_S| > \theta_1$). When the vehicle is running at low speeds during the transition from the substantially straight-ahead driving state ($|\theta_S| \leq \theta_1$) to the turning state ($|\theta_S| > \theta_1$), steering ratio R is still maintained at predetermined maximum steering ratio $R_{MAX}$ (that is, conventional gear ratio Rc) suited to the low speed range, thus ensuring a smooth transition from the fixed $\theta_S$–$\theta_W$ characteristic (the fixed steering ratio $R_{MAX}$ control) to the vehicle-speed V dependent $\theta_S$–$\theta_W$ characteristic (the variable steering ratio R control). Conversely when the vehicle is running at high speeds during the transition from the substantially straight-ahead driving state ($|\theta_S| \leq \theta_1$) to the turning state ($|\theta_S| > \theta_1$), the variable ratio steering system of the second embodiment exhibits a high steering response at the beginning of steering wheel movement in either turning direction owing to steering ratio R controlled at and near predetermined maximum steering ratio $R_{MAX}$ (that is, conventional gear ratio Rc). However, during such a transition the system control mode can be rapidly changed from the fixed steering ratio $R_{MAX}$ control mode (the fixed steering ratio Rc control mode) to the variable steering ratio R control mode (the higher speed $\theta_S$–$\theta_W$ characteristic indicated by the fine solid line in FIG. 5 and having a relatively lower gradient), thereby reliably suppressing an oversensitive vehicle behavior during steering action. In simple planetary gear system 10 of variable steering ratio mechanism 3 incorporated in the system of the second embodiment, conventional gear ratio Rc, which is structurally determined by connecting the input shaft to planetary gear PG, and connecting the output shaft to ring gear RG, and connecting the output shaft of electric motor 9 to sun gear SG, is set to predetermined maximum steering ratio $R_{MAX}$ of the low speed range ($0 \leq V \leq V_1$). Alternatively, conventional gear ratio Rc may be set to predetermined maximum steering ratio $R_{MAX}$ suited to the low speed range by properly selecting the ratio between the number of teeth of sun gear SG and the number of teeth of ring gear RG.

Figure 8:
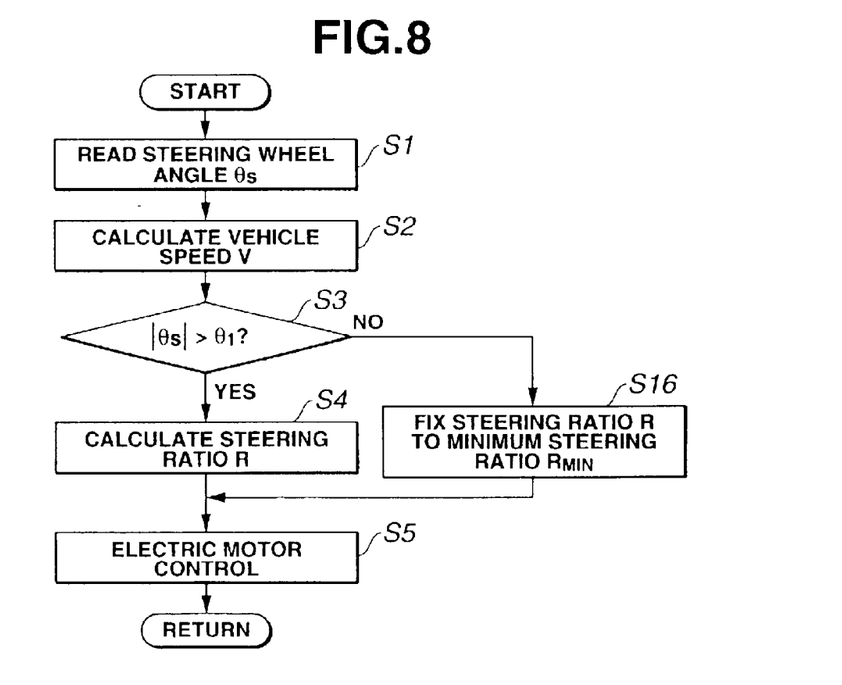
FIG. 8 is a flow chart illustrating a variable steering ratio control routine executed by a control unit incorporated in the variable ratio steering system of the third embodiment.
Figure 9:
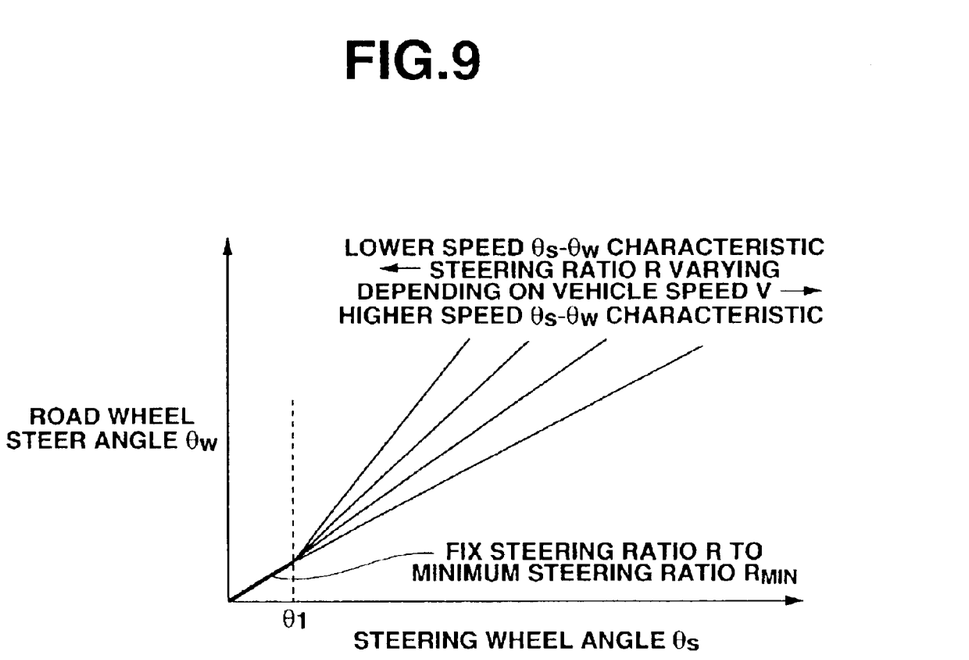
FIG. 9 is an explanatory view illustrating a fixed steering ratio $R_{MIN}$ characteristic and variations in vehicle-speed dependent steering wheel angle $\theta_S$ versus road wheel steer angle $\theta_W$ characteristics of the variable ratio steering system of the third embodiment in presence of a transition from a steering-ratio control state in which steering ratio R is controlled to a minimum steering ratio $R_{MIN}$ to another steering-ratio control state based on the vehicle speed.

Referring now to FIGS. 8 and 9, there is shown the variable ratio steering system of the third embodiment. The system of the third embodiment of FIGS. 8 and 9 is similar to that of the second embodiment of FIGS. 6 and 7. The system of the third embodiment of FIGS. 8 and 9 is different from that of the second embodiment of FIGS. 6 and 7, in that in the system of the third embodiment steering ratio R is fixed to predetermined minimum steering ratio $R_{MIN}$ suited to the high speed range in case of $|\theta_S| \leq \theta_1$, and thereafter electric motor 9 is controlled in response to steering ratio controlled variable C based on both a sign of steering wheel angle $\theta_S$ and predetermined minimum steering ratio $R_{MIN}$. FIG. 8 shows the variable steering ratio control routine executed by ECU 13 incorporated in the variable ratio steering system of the third embodiment. The arithmetic processing shown in FIG. 8 is also executed as time-triggered interrupt routines to be triggered every predetermined sampling time intervals. The arithmetic processing of FIG. 8 is similar to the arithmetic processing of FIG. 3 (the first embodiment) rather than the arithmetic processing of FIG. 7 (the second embodiment), except that step S6 is replaced by step S16 and in case of $|\theta_S| \leq \theta_1$ the routine flows from step S3 via step S16 to step S5. Thus, the same step numbers used to designate steps in the routine shown in FIG. 3 will be applied to the corresponding step numbers used in the modified arithmetic processing shown in FIG. 8, for the purpose of comparison of the two different interrupt routines. Detailed description of steps S1 through S5 will be omitted because the above description thereon seems to be self-explanatory.

According to the system of the third embodiment shown in FIGS. 8 and 9, when the answer to step S3 is in the negative (NO), that is, in case of $|\theta_S| \leq \theta_1$, ECU 13 determines that the vehicle is maintained in a substantially straight-ahead driving state. In this case, the routine proceeds from step S3 to step S16. At step S16, in order to prevent or inhibit steering ratio R from fluctuating or changing depending on changes in vehicle speed V, steering ratio R is controlled or fixed to predetermined minimum steering ratio $R_{MIN}$ suited to the high speed range. In other words, in case of $|\theta_S| \leq \theta_1$, predetermined minimum steering ratio $R_{MIN}$ suited to the high speed range is held or determined as steering ratio R, until steering wheel angle $\theta_S$ exceeds predetermined angle $\theta_1$. Thereafter, the routine proceeds from step S16 to step S5. At step S5, first, steering ratio controlled variable C is calculated based on both a sign of steering wheel angle $\theta_S$ and predetermined minimum steering ratio $R_{MIN}$. Second, a control signal corresponding to the steering ratio controlled variable C based on the sign of steering wheel angle $\theta_S$ and predetermined minimum steering ratio $R_{MIN}$ is output from the output interface of ECU 13 to electric motor 9, so as to execute steering ratio control based on the fixed $\theta_S$–$\theta_W$ characteristic (the fixed steering ratio $R_{MIN}$ characteristic). In the variable steering ratio control routine shown in FIG. 8, the processing of step S1 and steering wheel angle sensor 11 serve as a steering wheel angle detector (steering wheel angle detecting means) that monitors or detects steering wheel angle $\theta_S$. The processing of step S2 and vehicle speed sensor 12 serve as a vehicle speed detector that monitors or detects vehicle speed V. The procedures of steps S3, S4, S5, and S16 serve as a steering ratio control circuitry (steering ratio control means).

With the previously-discussed arrangement of the third embodiment shown in FIGS. 8 and 9, suppose that the vehicle is maintained in a substantially straight-ahead driving state while manually maintaining steering wheel 1 at an angular position that the steering wheel angle $\theta_S$ detected is less than or equal to predetermined angle $\theta_1$. As can be seen from the $\theta_S$–$\theta_W$ characteristic shown in FIG. 9, in the system of the third embodiment, variable steering ratio mechanism 3 is controlled based on predetermined minimum steering ratio $R_{MIN}$ of the high speed range by means of ECU 13, until steering wheel angle $\theta_S$ exceeds predetermined angle $\theta_1$. That is to say, during a time period defined by $|\theta_S| \leq \theta_1$, ECU 13 computes or calculates steering ratio controlled variable C for electric motor 9 on the basis of predetermined minimum steering ratio $R_{MIN}$ (constant steering ratio). Then, a control signal corresponding to steering ratio controlled variable C based on predetermined minimum steering ratio $R_{MIN}$ is produced. As a result of this, it is possible to obtain road wheel steer angle $\theta_W$ based on predetermined minimum steering ratio $R_{MIN}$ (held constant in the predetermined high speed range irrespective of changes in vehicle speed V), for steering wheel angle $\theta_S$ required to maintain the substantially straight-ahead driving state. The steering ratio controlled variable C is used to control a sun-gear rotation speed having the same sense as the turning direction of steering wheel 2. For instance, when steering wheel 1 is turned to the left (or to the right) and additionally steering wheel angle $\theta_S$ is less than or equal to predetermined angle $\theta_1$, the variable ratio steering system of the third embodiment operates as follows. During a right turn (a left turn) with a slight steering wheel angle below predetermined angle $\theta_1$, sun gear SG rotates clockwise (or counterclockwise) by way of clockwise rotation (or counterclockwise rotation) of the output shaft of electric motor 9. On the other hand, planetary gear PG rotates clockwise (or counterclockwise) via steering shaft 2 (see FIG. 6). As a result of rotary motion of planetary gear PG having the same rotation direction as rotary motion of sun gear SG, the amount of clockwise rotary motion (or counterclockwise rotary motion) of ring gear RG in meshed-engagement with planetary gear PG is decreased or reduced. In this case, simple planetary gear system 10 acts as a speed reducer. For steering wheel angle $\theta_S$ ($\leq \theta_1$) required for a slight turn, by virtue of the previously-discussed speed reducing action of simple planetary gear system 10, the system of the third embodiment can provide road wheel steer angle $\theta_W$ based on predetermined minimum steering ratio $R_{MIN}$ (held constant in the predetermined high speed range irrespective of changes in vehicle speed V). As set forth above, according to the system of the third embodiment, steering ratio R is fixed to predetermined minimum steering ratio $R_{MIN}$ irrespective of changes in vehicle speed V when the vehicle is in a substantially straight-ahead driving state ($|\theta_S| \leq \theta_1$). Therefore, the steering wheel angle $\theta_S$ versus road wheel steer angle $\theta_W$ characteristic (the steering ratio R characteristic, in other words, the proper relationship between steering wheel angle $\theta_S$ and road wheel steer angle $\theta_W$) can be kept constant, even when a so-called tempa tire (a temporary-use tire) having a tire diameter smaller than a usual tire diameter is installed on either one of a pair of steered wheels, or even when a wheel alignment difference between the steered wheels exists as a result of long driving and frictional contact with curbs. This insures the feeling of better stability of the angular position of steering wheel 1 even when the vehicle is in the substantially straight-ahead driving state ($|\theta_S| \leq \theta_1$). In contrast to the above, when the operating state of the vehicle is changed from the substantially straight-ahead driving state ($|\theta_S| \leq \theta_1$) to a turning state ($|\theta_S| > \theta_1$), the $\theta_S$–$\theta_W$ characteristic is changed from the fixed $\theta_S$–$\theta_W$ characteristic (see the fixed steering ratio $R_{MIN}$ characteristic indicated by the heavy solid line in FIG. 9 and used in case of steering wheel angle $\theta_S$ defined by the inequality $|\theta_S| > \theta_1$) to a vehicle-speed V dependent $\theta_S$–$\theta_W$ characteristic (see the variable steering ratio R characteristics indicated by the fine solid lines in FIG. 9 and used in case of steering wheel angle $\theta_S$ defined by the inequality $|\theta_S| > \theta_1$). When the vehicle is running at high speeds during the transition from the substantially straight-ahead driving state ($|\theta_S| \leq \theta_1$) to the turning state ($|\theta_S| > \theta_1$), steering ratio R is still maintained at predetermined minimum steering ratio $R_{MIN}$ suited to the high speed range, thus ensuring a smooth transition from the fixed $\theta_S$–$\theta_W$ characteristic (in other words, the fixed steering ratio $R_{MIN}$ control) to the vehicle-speed V dependent $\theta_S$–$\theta_W$ characteristic (in other words, the variable steering ratio R control). Conversely when the vehicle is running at low speeds during the transition from the substantially straight-ahead driving state ($|\theta_S| \leq \theta_1$) to the turning state ($|\theta_S| > \theta_1$), the variable ratio steering system of the third embodiment exhibits a low steering response at the beginning of steering wheel movement in either turning direction owing to steering ratio R controlled at and near predetermined minimum steering ratio $R_{MIN}$. However, during such a transition the system control mode can be rapidly changed from the fixed steering ratio $R_{MIN}$ control mode (see the fixed $\theta_S$–$\theta_W$ characteristic of FIG. 9) to the variable steering ratio R control mode (see the lower speed $\theta_S$–$\theta_W$ characteristic indicated by the fine solid line in FIG. 9 and having a relatively higher gradient), and whereby it is possible to provide a large road wheel steer angle $\theta_W$ in spite of a small steering wheel movement. According to the system of the third embodiment, in case of $|\theta_S| \leq \theta_1$, steering ratio R is set to predetermined minimum steering ratio $R_{MIN}$ of the high speed range. Such setting of steering ratio R to predetermined minimum steering ratio $R_{MIN}$ suited to the high speed range is suitable to realize a smooth transition from the fixed steering ratio $R_{MIN}$ control mode to the vehicle-speed dependent variable steering ratio R control mode under a particular vehicle operating condition such as during an express-highway driving. In the system of the third embodiment shown in FIGS. 8 and 9, steering ratio R is controlled or fixed to predetermined minimum steering ratio $R_{MIN}$ suited to the high speed range in case of $|\theta_S| \leq \theta_1$. In order to provide almost the same effect and operation of the system of the third embodiment, such setting of steering ratio R to predetermined minimum steering ratio $R_{MIN}$ may be somewhat modified so that steering ratio R is controlled or fixed to a predetermined small steering ratio substantially corresponding to minimum steering ratio $R_{MIN}$. The predetermined small steering ratio is set to a value near minimum steering ratio $R_{MIN}$, but not equal to minimum steering ratio $R_{MIN}$.

As discussed above, in case of $|\theta_S| \leq \theta_1$, the system of the third embodiment operates in the fixed steering ratio $R_{MIN}$ control mode so that steering ratio R is brought closer to predetermined minimum steering ratio $R_{MIN}$ of the high speed range. In lieu thereof, simple-planetary-gear-system conventional gear ratio Rc, which is structurally determined by connecting ring gear RG to steering shaft 2, and connecting planetary gear PG to pinion shaft 4, and connecting sun gear SG to the output shaft of electric motor 9, may be set to predetermined minimum steering ratio $R_{MIN}$ of the high speed range, and additionally electric motor 9 of variable steering ratio mechanism 3 may be maintained in a non-control state.

In the first, second, and third embodiments, as an actuator that changes or adjusts the steering ratio of variable steering ratio mechanism 3, electric motor 9, such as a step motor, is used. It will be appreciated that electric motor 9 may be replaced with another drive source, for example, a fluid-pressure operated motor. Furthermore, in the first, second, and third embodiments, in presence of shifting from a state defined by the inequality $|\theta_S| \leq \theta_1$, to a state defined by the inequality $|\theta_S| > \theta_1$, the system operating mode is switched from the fixed steering ratio control mode to the variable steering ratio control mode (the vehicle-speed dependent steering ratio control mode). In lieu thereof, in order to reduce the steering work or steering effort when the steering wheel is turned, in presence of shifting from a state defined by the inequality $|\theta_S| \leq \theta_1$ to a state defined by the inequality $|\theta_S| > \theta_1$, the variable ratio steering system may be operated in a steering-wheel-torque dependent steering ratio control mode according to which steering ratio R is variably controlled in response to the magnitude of steering wheel torque that is applied to steering wheel 1 about it axis of rotation.

In the shown embodiments, in order to prevent or inhibit steering ratio R from fluctuating or changing depending on changes in vehicle speed V in case of $|\theta_S| \leq \theta_1$, steering ratio R is controlled or fixed to either of the predetermined maximum steering ratio $R_{MAX}$ of the low speed range, the predetermined large steering ratio substantially corresponding to maximum steering ratio $R_{MAX}$, the predetermined minimum steering ratio $R_{MIN}$ of the high speed range, and the predetermined small steering ratio substantially corresponding to minimum steering ratio $R_{MIN}$. In lieu thereof, for the purpose of insuring the feeling of better stability of the angular position of steering wheel 1 even during the substantially straight-ahead driving, in case of $|\theta_S| \leq \theta_1$, steering ratio R may be kept at a predetermined constant steering ratio within limits. As a matter of course, the predetermined constant steering ratio may be a value different from the aforesaid four values, namely the predetermined maximum steering ratio $R_{MAX}$ of the low speed range, the predetermined large steering ratio substantially corresponding to maximum steering ratio $R_{MAX}$, the predetermined minimum steering ratio $R_{MIN}$ of the high speed range, and the predetermined small steering ratio substantially corresponding to minimum steering ratio $R_{MIN}$.

In the shown embodiments, simple planetary gear system 10 constructs a part of variable steering ratio mechanism 3. To provide the same operation as simple planetary gear system 10 that serves as a speed variator, namely, speed-increasing action and speed-reducing action, simple planetary gear system 10 may be replaced with a ball-bearing-screw mechanism (simply, a ball-screw mechanism), which is constructed by a worm shaft on one end of the steering shaft, a ball nut, and recirculating balls interposed between the worm teeth of the worm shaft and grooves cut in the inner face of the ball nut.

The entire contents of Japanese Patent Application No. P2001-380532 (filed Dec. 13, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A variable ratio steering system of a vehicle comprising:
   a variable steering ratio mechanism that varies a steering ratio of a steering angle of a manually-operated steering mechanism to a road wheel steer angle at a steered road wheel;
   a vehicle speed sensor that detects a vehicle speed;
   a steering angle sensor that detects the steering angle;
   a steering ratio control unit configured to be electronically connected to the vehicle speed sensor, the steering angle sensor and the variable steering ratio mechanism, for controlling the variable steering ratio mechanism responsively to the vehicle speed and the steering angle; and
   wherein the steering ratio control unit keeps the steering ratio constant irrespective of the vehicle speed under a condition where the steering angle is less than or equal to a predetermined angle substantially corresponding to a neutral position of the manually-operated steering mechanism, for stabilizing a steering-wheel angular position, required to maintain a running state of the vehicle at straight ahead, at the neutral position, in presence of offsetting of a steering angle versus road wheel steer angle characteristic from a predetermined characteristic.

2. The variable ratio steering system as claimed in claim 1, wherein:
   the steering ratio control unit controls the variable steering ratio mechanism so that the steering ratio is fixed to a predetermined steering ratio suited to a low speed range irrespective of the vehicle speed when the steering angle is less than or equal to the predetermined angle substantially corresponding to the neutral position of the manually-operated steering mechanism.

3. The variable ratio steering system as claimed in claim 1, wherein:
   the steering ratio control unit controls the variable steering ratio mechanism so that the steering ratio is fixed to a predetermined maximum steering ratio irrespective of the vehicle speed when the steering angle is less than or equal to the predetermined angle substantially corresponding to the neutral position of the manually-operated steering mechanism.

4. The variable ratio steering system as claimed in claim 1, wherein:
   the steering ratio control unit fixes the steering ratio to a predetermined steering ratio suited to a high speed range irrespective of the vehicle speed when the steering angle is less than or equal to the predetermined angle substantially corresponding to the neutral position of the manually-operated steering mechanism.

5. The variable ratio steering system as claimed in claim 1, wherein:
   the steering ratio control unit fixes the steering ratio to a predetermined minimum steering ratio irrespective of the vehicle speed when the steering angle is less than or equal to the predetermined angle substantially corresponding to the neutral position of the manually-operated steering mechanism.

6. A variable ratio steering system of a vehicle comprising:
   a variable steering ratio mechanism that varies a steering ratio of a steering angle of a manually-operated steering mechanism to a road wheel steer angle at a steered road wheel;
   a vehicle speed sensor that detects a vehicle speed;
   a steering angle sensor that detects the steering angle;
   a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle; and
   the steering ratio control unit having a processor programmed to perform the following:
   (a) executing the fixed steering ratio control mode in which the steering ratio is kept constant irrespective of the vehicle speed under a condition where the steering angle is less than or equal to a predetermined angle substantially corresponding to a neutral position of the manually-operated steering mechanism, for stabilizing a steering-wheel angular position, required to maintain a running state of the vehicle at straight ahead, at the neutral position, in presence of offsetting of a steering angle versus road wheel steer angle characteristic from a predetermined characteristic; and
   (b) executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

7. The variable ratio steering system as claimed in claim 6, wherein:
   in order to execute the fixed steering ratio control mode, the steering ratio control unit switches the variable steering ratio mechanism to a non-control state to maintain the steering ratio at a structurally-determined steering ratio of the variable steering ratio mechanism.

8. The variable ratio steering system as claimed in claim 6, wherein:
   in order to execute the fixed steering ratio control mode, the steering ratio control unit fixes the steering ratio to a predetermined steering ratio suited to a low speed range.

9. The variable ratio steering system as claimed in claim 6, wherein:
   in order to execute the fixed steering ratio control mode, the steering ratio control unit fixes the steering ratio to a predetermined maximum steering ratio.

10. The variable ratio steering system as claimed in claim 6, wherein:
    in order to execute the fixed steering ratio control mode, the steering ratio control unit fixes the steering ratio to a predetermined steering ratio suited to a high speed range.

11. The variable ratio steering system as claimed in claim 6, wherein:
in order to execute the fixed steering ratio control mode, the steering ratio control unit fixes the steering ratio to a predetermined minimum steering ratio.

12. In a computer-controlled variable ratio steering system for an automotive vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the system comprising:
(a) a first variable ratio steering means for executing the fixed steering ratio control mode in which the steering ratio is kept constant irrespective of the vehicle speed under a condition where the steering angle is less than or equal to a predetermined angle substantially corresponding to a neutral position of the manually-operated steering mechanism, for stabilizing a steering-wheel angular position, required to maintain a running state of the vehicle at straight ahead, at the neutral position, in presence of offsetting of a steering angle versus road wheel steer angle characteristic from a predetermined characteristic; and
(b) a second variable ratio steering means for executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

13. A method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprising:
executing the fixed steering ratio control mode by keeping the steering ratio constant irrespective of the vehicle speed under a condition where the steering angle is less than or equal to a predetermined angle substantially corresponding to a neutral position of the manually-operated steering mechanism, for stabilizing a steering-wheel annular position, required to maintain a running state of the vehicle at straight ahead, at the neutral position, in presence of offsetting of a steering angle versus road wheel steer angle characteristic from a predetermined characteristic; and
executing the vehicle-speed dependent steering ratio control mode by varying a steering angle versus road wheel steer angle characteristic depending on the vehicle speed, when the steering angle is greater than the predetermined angle substantially corresponding to the neutral position of the manually-operated steering mechanism.

14. A method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprising:
comparing the steering angle to a predetermined angle substantially corresponding to a neutral position of the manually-operated steering mechanism;
fixing the steering ratio to a predetermined steering ratio suited to a high speed range for execution of the fixed steering ratio control mode under a condition where the steering angle is less than or equal to the predetermined angle substantially corresponding to the neutral position of the manually-operated steering mechanism, for stabilizing a steering-wheel angular position, required to maintain a running state of the vehicle at straight ahead, at the neutral position, in presence of offsetting of a steering angle versus road wheel steer angle characteristic from a predetermined characteristic; and
executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

15. A method for executing variable ratio steering functions for a computer-controlled variable ratio steering system of a vehicle with an electronically-controlled variable steering ratio mechanism varying a steering ratio of a steering angle of a manually-operated steering mechanism to a road wheel steer angle at a steered road wheel, a vehicle speed sensor detecting a vehicle speed, a steering angle sensor detecting the steering angle, and a steering ratio control unit configured to be electronically connected to the vehicle speed sensor, the steering angle sensor and the variable steering ratio mechanism, for controlling the variable steering ratio mechanism responsively to the vehicle speed and the steering angle and for switching between a fixed steering ratio control mode and a vehicle-speed dependent steering ratio control mode responsively to the steering angle, the method comprising:

comparing the steering angle to a predetermined angle substantially corresponding to a neutral position of the manually-operated steering mechanism;

fixing the steering ratio to a predetermined minimum steering ratio for execution of the fixed steering ratio control mode under a condition where the steering angle is less than or equal to the predetermined angle substantially corresponding to the neutral position of the manually-operated steering mechanism, for stabilizing a steering-wheel angular position, required to maintain a running state of the vehicle at straight ahead, at the neutral position, in presence of offsetting of a steering angle versus road wheel steer angle characteristic from a predetermined characteristic; and executing the vehicle-speed dependent steering ratio control mode in which a steering angle versus road wheel steer angle characteristic varies depending on the vehicle speed, when the steering angle is greater than the predetermined angle substantially corresponding to the neutral position of the manually-operated steering mechanism.

* * * * *

UNITED STATES PATENT AND TRADEMARK OFFICE
CERTIFICATE OF CORRECTION

PATENT NO. : 7,065,436 B2  Page 1 of 1
APPLICATION NO. : 10/299697
DATED : June 20, 2006
INVENTOR(S) : Kazuo Hara It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 312 days Delete the phrase "by 312 days" and insert -- by 432 days --

Signed and Sealed this

Twelfth Day of August, 2008

JON W. DUDAS
*Director of the United States Patent and Trademark Office*